Patented Feb. 19, 1952

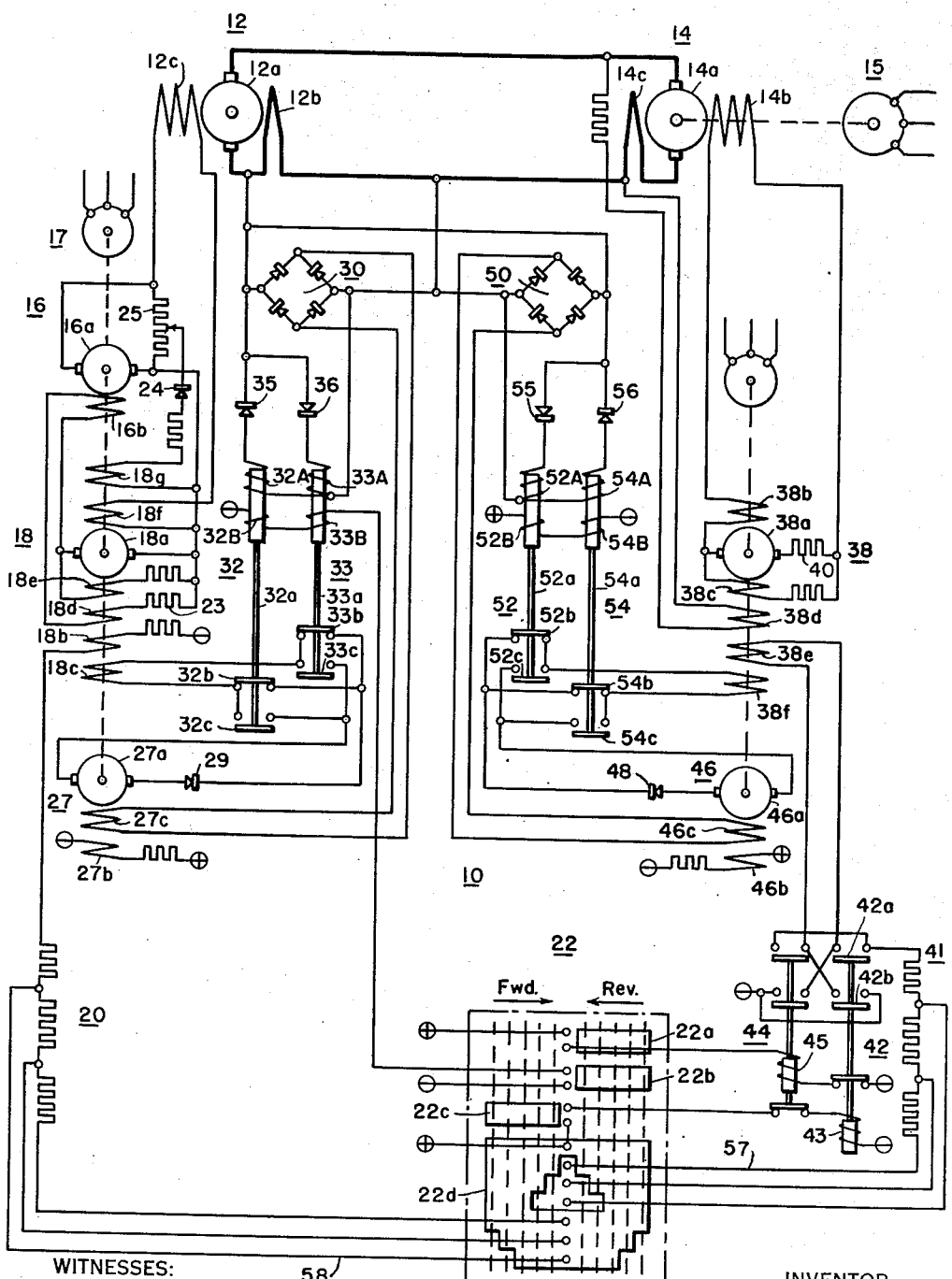

2,586,284

UNITED STATES PATENT OFFICE 2,586,284

MOTOR CONTROL SYSTEM

Donald E. Abell, Buffalo, N. Y., assignor to Westinghouse Electric Corporation, East Pittsburgh, Pa., a corporation of Pennsylvania Application May 2, 1950, Serial No. 159,497

5 Claims. (Cl. 318—144)

My invention relates generally to motor control systems, and has reference in particular to control systems for reversible motors, such as may be used in reversing mill drives and the like.

Generally stated, it is an object of my invention to provide a current limit motor control system for reversing motors that is simple and inexpensive to manufacture, and is reliable and effective in operation.

More specifically, it is an object of my invention to provide, in a motor control system, for selectively producing control voltages for limiting the value of the motor armature current over a wide range of operating conditions.

Another object of my invention is to provide, in a control system for a reversible motor, for selectively energizing a current limit field winding on a regulating generator used to control the motor in opposite senses so as to prevent the armature current of the motor from increasing above a predetermined value, regardless of whether the motor is motoring or regenerating.

Yet, another object of my invention is to provide, in a reversing motor control system, for operating on the field excitation circuits of both the motor and a generator supplying armature current to the motor so as to prevent the motor armature current from exceeding a predetermined maximum value.

It is an important object of my invention to provide, in a control system for a reversible motor, for selectively changing the effective polarization of current limit control relays for limiting the motor armature current in accordance with the operating position of a master switch controlling the direction of operation of the motor.

It is also an important object of my invention to provide for utilizing bias field excitation and rectifier blocking devices with current limit generators which are responsive to the value of the armature current of a motor for controlling the field excitation, both of the motor and of a generator supplying armature current to the motor.

Other objects will, in part, be obvious and will, in part, be explained hereinafter.

In accordance with one embodiment of my invention, the armature of the drive motor of a reversing mill stand is supplied with electrical energy from a generator having a field winding energized from a regulating generator which has a pattern field winding disposed to be reversibly connected to a source of control voltage for determining the strength and direction of the generator field excitation. Overcurrent protection is provided by utilizing a current limit field winding on the regulating generator disposed to be reversibly connected to a current limit generator which is responsive to the value of the motor armature current, by polarized relays which are selectively responsive to both the value and direction of the motor armature current. The motor field excitation is supplied from a regulating generator having a current limit field winding connected by polarized relays to a current limit generator responsive to the value of the motor armature current. Bias windings on these relays are energized when the master switch controlling the operation of the motor is operated to reverse the motor, so as to change the effective polarity response of the relays and make them selectively responsive to motoring and generating currents for either direction of operation of the motor.

For a more complete understanding of the nature and scope of my invention, reference may be made to the following detailed description which may be read in connection with the accompanying drawing in which the single figure is a diagrammatic view of a control system for a reversing motor.

Referring generally to the single figure of the drawing, the reference numeral 10 may denote generally a control system for a reversing motor 12, which may be supplied with electrical energy from a main generator 14 having connected in driving relation therewith a prime mover, such as the alternating current motor 15.

The motor 12 may comprise an armature 12a, a series field or commutating winding 12b and a separately excited main field winding 12c. The windings 12c may be supplied with field excitation from a motor exciter 16 driven by a motor 17, and having an armature 16a and a field winding 16b. Excitation of the field winding 16b may be provided by means of a regulating generator 18 comprising an armature 18a, a pattern field winding 18b, a current limit field winding 18c, a self-energizing type of field winding 18d, an anti-hunt field winding 18e, a control field winding 18f, and a modifying field winding 18g.

The pattern field winding 18b may be connected to a suitable source of electrical energy represented by positive and negative terminals through several sections of a control resistor 20 and a master control switch 22 having a contact member or segment 22d disposed to provide for selectively varying the effective number of sections of the control resistor 20 connected in circuit relation with the pattern field winding. The self-energizing field winding 18d may be connected in series circuit relation with the armature 18a of the regulating generator and the field winding 16b of the motor exciter in circuit relation with a control resistor 23 to provide compensation for the air gap M. M. F. losses of the regulating generator. The antihunt field winding 18e may be connected across the armature 18a in a differential sense with respect to the pattern field winding 18b.

The control field winding 18f may be connected in series circuit relation with the field winding 12c and the armature 16a of the motor exciter, so as to be responsive to the field excitation of the motor 12 and differential with respect to the pattern field winding 18b. The modifying field winding 18g may be connected in a bridge circuit across the armatures 18a and 16a through a rectifier device 24 and potentiometer 25 so as to provide a transient correction so long as a transient time phase differential exists between the voltages of the regulating generator 18 and the exciter 16.

In order to provide for limiting the armature current of the motor 12, a motor current limit generator 27 may be provided, having an armature 27a, a current field winding 27c, and a bias field winding 27b. The bias field winding 27b may be disposed to render the current limit effective above a predetermined threshhold value of motor armature current being, for example, connected to a suitable source of control potential so as to provide a terminal voltage at the armature of the generator 27 which may be blocked by means of a rectifier device 29. The current limit field winding 27c may be connected for energization in accordance with the value only, of the armature current of the motor 12, being, for example, connected across the series field winding 12b by means of a full-wave bridge type rectifier circuit 30.

The current limit generator 27 may be selectively connected to the current limit field winding 18c by means of generating and motoring control relays 32 and 33 which may be disposed to reversibly connect the field winding 18c to the generator 27. The relays 32 and 33 may comprise armatures 32a and 33a having operating windings 32A and 33A, respectively. The control relays 32 and 33 may also be provided with bias or polarizing control windings 32B and 33B, respectively. The main operating windings 32A and 33A may be connected across the series field winding 12b through oppositely disposed rectifier devices 35 and 36 so as to make the control relays selectively responsive to the polarity of the armature current of the motor 12.

The control relay 32 may be connected so as to respond to a reverse or generating overcurrent, so as to connect the current limit winding 18c in a direction to decrease the excitation of the field winding 12c and reduce the value of said generating or regenerative current.

The control relay 33 may be connected to operate in response to a motoring current of greater than predetermined value, so as to connect the current limit field winding 18c cumulatively with respect to the pattern field winding 18b, to increase the field excitation of the motor and hence reduce the value of the armature current under motoring conditions.

In order to obtain the proper results when the motor is reversed, and the direction of the armature current when motoring is opposite to that for the forward direction of operation, the bias field windings 32B and 33B may be connected to a source of electrical energy through the master control switch 22 by means of contact member 22b, so as to normally effect operation of the relays 32 and 33. The bias or polarizing windings 32B and 33B may be so disposed with respect to the main operating windings 32A and 33A, respectively, that upon energization of either main operating winding, the respective control relay will thereupon return to the deenergized position.

The main generator 14 may comprise an armature 14a, a main field winding 14b, and a series or commutating field winding 14c. The commutating field winding 14c may be connected in series circuit relation with the armature 14a and the armature 12a of the motor. The field winding 14b of the main generator may be energized from a regulating generator 38 comprising an armature 38a, a self-energizing field winding 38b, an anti-hunt field winding 38c, a differential voltage field winding 38d, a pattern field winding 38e, and a current limit field winding 38f.

The self-energizing field winding 38b may be connected in series circuit relation with the armature 38a, a field winding 14b of the generator, and a control resistor 40. The anti-hunt field winding 38c may be connected across the armature 38a in a differential sense with respect to the pattern field winding 38e. The differential field winding 38d may be connected across the armature 14a of the main generator so as to be energized in accordance with the output voltage of the main generator and oppose the effects of the pattern field winding. The pattern field winding 38e may be connected to a suitable source of control voltage through a control resistor 41 having several sections, and segment 22d of the master control switch 22.

"Forward" and "reverse" control relays 42 and 44 having operating windings 43 and 45 may be provided for selectively controlling the polarity of the pattern field winding 38e through "forward" and "reverse" segments 22c and 22a of the master control switch 22.

The current limit field winding 38f may be energized from a motor current limit generator 46 comprising an armature 46a, a current limit field winding 46c, and a bias field winding 46b. The bias field winding may be connected to a suitable source of electrical energy so as to produce an output voltage at the armature 46a which may be blocked by a rectifier device 48. The current limit field winding 46c may be connected oppositely with respect to the bias field winding, by means of a full-wave rectifier bridge circuit 50 disposed across the series field winding 12b of the motor 12, so as to be responsive to the value only, of the motor armature current. The connection of the current limit field winding 38f to the armature 46a of the current limit generator 46 may be controlled by means of forward and regenerative current control relays 52 and 54, comprising armatures 52a, 54a, operating windings 52A, 54A, and auxiliary windings 52B, 54B, respectively.

The operating windings 52A and 54A may be connected across the series field winding 12b so as to be energized in accordance with the motor armature current, and they may be polarized by means of rectifier devices 55 and 56 disposed in opposite senses. The auxiliary windings 52B and 54B may be connected to a suitable source of electrical energy so as to be cumulative with respect to their operating windings, having insufficient ampere turns to effect operation of the relays or maintain them in the operated position without the energization of the main or operating windings.

When the master control switch is operated in the "forward" direction, an obvious energizing circuit is provided for the operating winding 43 of the "forward" control relay 42, which thereupon connects the pattern field winding 38e to the source of electrical energy through contact members 42a and 42b, the three sections of the control resistor 41, and conductor 57 at contact segment 22d. At the same time, the pattern field winding 18b of the motor regulating generator 18 will be energized at its maximum value through the upper section only of control resistor 20, conductor 57 and contact segment 22d of the master control switch. Accordingly, the regulating generators 38 and 18 operate to maintain the field excitation of the generator field winding 14b and motor field winding 12c at the predetermined desired values.

Should the load on the motor 12 increase above a predetermined maximum value, the operating winding 33A of the motoring control relay 33 will be sufficiently energized to effect operation of relay 33, thus connecting the current limit field winding 18c of the regulating generator 18 to the armature 27a of the current limit generator 27 through contact members 33c and 32b in such a sense as to increase the output voltage of the regulating generator. The output voltage will be increased in accordance with the excess of the motor armature current over the predetermined value which will be determined by the degree of energization of the bias field winding 27c. This increase of field excitation tends to reduce the speed of the motor 12, and hence reduce the value of its armature current.

At the same time, the excitation of the current limit field winding 46c of the current limit generator 46 increases, and control relay 52 operates to the energized position, thus connecting the current limit field winding 38f to the current limit generator 46 through contact members 52c and 54b in such a sense as to oppose the pattern field winding and reduce the armature voltage of the generator 14. This also tends to reduce the armature current of the motor 12. The energization of the bias field winding 46 will again determine at what value of armature current the current limit generator 46 will become effective.

Should the motor 12 tend to regenerate, control relay 32 will operate instead of the control relay 33. The current limit field winding 18c will thereupon be connected to the current limit generator 27 in the opposite sense through contact members 32c and 33b, thus decreasing the field excitation of the motor field winding 12c so as to reduce the value of the regenerative current. At the same time the reverse current control relay 54 will operate, connecting the current limit field winding 38f of the regulating generator 38 to the current limit generator 46 in the opposite sense through contact members 52b and 54c, so as to increase the excitation of the generator field winding 14b and thus reduce the value of the regenerative armature current.

When the motor 12 is operating in the reverse direction, the master control switch 22 will be operated to the reverse position so that relays 32 and 33 will be energized through contact member 22b and will tend to be normally operated to the energized positions. So long as the armature current of the motor 12 remains below the predetermined desired value, the current limit field winding 18c will remain disconnected.

When the armature current of the motor exceeds the predetermined value while the motor is motoring, generating control relay 32 will return to the deenergized position, thus connecting the current limit winding 18c through contact members 32b and 33c in a sense to strengthen the excitation of the motor field winding 12c and reduce the value of the motoring current. At the same time, the reverse current control relay 54 will be energized, connecting the current limit field winding 38f through contact members 52b and 54c in a direction to weaken the now reversed pattern field winding 38e and reduce the value of the motor armature current.

For a regenerative current in the reverse direction the motoring control relay 33 drops to the deenergized position to connect the current limit field winding 18c in such a sense as to reduce the field excitation of the motor field winding 12c, while the forward current control relay 52 operates to connect the current limit field winding 38f in a sense, such as to increase the output voltage of the generator 14 to limit the value of the motor armature current.

From the above description and the accompanying drawing, it will be apparent that I have provided a simple and effective current limit control system which uses simple and inexpensive equipment having a very sharp cut-off and therefore providing accurate control of the value of the motor armature current. By using control relays for switching the connections of the current limit field windings, the values of reverse voltages are maintained at a minimum, and hence the reverse voltage service of the rectifier devices is reduced to a minimum. Since the current limit generators always operate on one side of the saturation curve, the problem of residual magnetism interfering with regulation does not arise. Only small amounts of power are shunted from the interpole or series field of the machines, thus preventing interference with the commutation characteristics thereof. The limiting action of the current limit generators may be readily controlled by varying the excitation of the bias field windings.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In a control system for a dynamoelectric machine having an armature and a field winding, generator means connected to supply electrical energy to the field winding of said machine, said generator means having a plurality of field windings, circuit means connecting one of said field windings to a source of control voltage to provide a pattern field, a current limit generator having an armature and a plurality of field windings, circuit means connecting one of the field windings of said current limit generator to be energized in accordance with the value of the armature current of the dynamo-electric machine, additional circuit means connecting another of said field windings of the current limit generator differentially to a source of bias voltage, rectifier means connected in circuit relation with the armature of the current limit generator to oppose the flow of current produced by said differentially connected field winding, and switch means operable to selectively connect the armature of the current limit generator in circuit relation with another one of the field windings of said generator means, said switch means being selectively responsive to the direction and value of the armature current of the dynamoelectric machine.

2. A control system for a generator comprising, a regulating generator connected to supply field excitation for said generator, said regulating generator having a plurality of field windings, circuit means reversibly connecting one of said windings to a source of control voltage to provide a pattern field basically determining the output voltage of the regulating generator, additional circuit means connecting another of said windings to be energized differentially in accordance with the output voltage of the generator, a current limit generator having an armature and a plurality of field windings, rectifier means connected in circuit relation with said armature, circuit means connecting one of the windings of the current limit generator to a source of bias voltage to produce an output voltage blocked by the rectifier means, circuit means including a full-wave rectifier connecting another of the field windings of the current limit generator to be energized differentially with respect to said one winding of the current limit generator and in accordance with the value of the generator armature current regardless of the direction of said armature current, and switch means operable to connect the armature of the current limit generator and the rectifier means to another of the field windings of the regulating generator in opposite senses, said switch means being selectively responsive to the value and direction of the generator armature current.

3. In a control system for a motor having an armature and a field winding, a regulating generator connected to control the field excitation of said motor, said regulating generator having a plurality of field windings, circuit means connecting one of the field windings of the regulating generator to a source of excitation to provide a pattern field and another of said field windings differentially in circuit relation with the motor field winding, a current limit generator having an armature and a plurality of field windings, a rectifier device connected in circuit relation with the armature of the current limit generator, circuit means connecting one of the field windings of the current limit generator to a source of bias voltage to produce an output voltage blocked by the rectifier device, circuit means including a full-wave rectifier bridge circuit connecting another one of the field windings of the current limit generator to be energized in only one sense in accordance with the value of the armature current of the motor, and switch means operable to selectively connect the armature of the current limit exciter and the rectifier device in circuit relation with another of the field windings of the regulating generator in opposite senses when the motor is motoring and regenerating.

4. A control system for a reversible motor having an armature disposed to be connected to a reversible source of electrical energy and a field winding comprising, generating means connected to supply field excitation to the motor field winding including a regulating generator having a plurality of field windings, circuit means connecting one of said windings to a source of control potential to provide a pattern field and another of said windings in a differential sense in circuit relation with the motor field winding, a current limit generator having an armature and a plurality of field windings, a full-wave rectifier bridge circuit connecting one of said current limit generator field windings to be energized in a predetermined sense in accordance with the value of the motor armature current, circuit means connecting another one of the current limit generator field windings to a source of bias voltage differentially with respect to said one winding of the current limit generator, rectifier means connected in circuit relation with the armature of the current limit generator to block the output voltage of said another one of the windings, switch means operable to selectively connect the armature of the current limit generator and the rectifier means in circuit relation with another one of the windings of the regulating generator, said switch means having bias windings and operating windings disposed to be energized in accordance with the armature current of the motor through oppositely disposed rectifier means, and circuit means connecting the bias windings to a source of bias voltage for normally operating said switch means when the motor is reversed, said biasing windings being opposite in effect to their respective operating windings.

5. A control system for a motor having an armature and a field winding comprising, a generator having a field winding and an armature connected in circuit relation with the motor armature, a regulating generator having a plurality of field windings and an armature connected to supply electrical energy to the generator field winding, switch means reversibly connecting one of said regulating generator field windings to a source of control voltage to provide a pattern field, additional circuit means connecting another of said plurality of field windings to be energized differentially in accordance with the output voltage of the generator armature, a current limit generator having a plurality of field windings and an armature, a full-wave rectifier bridge circuit connecting one of said field windings of the current limit generator to be energized in accordance with the armature current of the motor, circuit means connecting another of said field windings of the current limit generator in a differential sense to said one winding, rectifier means connected in circuit relation with the armature of the current limit generator to block the flow of current resulting from energization of said differential winding, a pair of switch means polarized in opposite senses disposed to selectively connect the armature of the current limit generator to another of the field windings of the regulating generator so as to effectively reduce the generator voltage on overload and increase it during regeneration, generating means connected to supply excitation for the field winding of the motor including a motor regulating generator having a plurality of field windings, circuit means connecting one of said field windings of the motor regulating generator to a source of control voltage to provide a pattern field and another one in series circuit relation with the field winding of the motor in a differential sense, a motor current limit generator having an armature and a plurality of field windings, a full-wave rectifier bridge circuit connecting one of the field windings of the motor current limit generator to be energized in accordance with only the value of the motor armature current, circuit means connecting another one of the field windings of the motor current limit generator in a differential sense to a source of control voltage, a rectifier device connected in series circuit relation with the armature of the motor current limit generator to block any output voltage produced by said another one of the motor current limit generator field windings, a pair of switch devices disposed to connect the armature of the motor current limit generator to another one of the regulating generator field windings in opposite senses, each of said switch devices having an operating winding and a differential winding, circuit means including oppositely disposed rectifier devices connecting the operating windings of said switches to be energized in accordance with the value of the motor armature current in opposite senses, and control means including a master switch operable to vary the energization of the generator and motor pattern field windings in predetermined relation and operable to forward and reverse positions to effect reversals of the connection of the generator pattern field winding to the source, said control means being operable in the reverse operating position to effect energization of the differential windings of the switch devices in opposed senses to their respective operating windings.

DONALD E. ABELL.

REFERENCES CITED

The following references are of record in the file of this patent:

UNITED STATES PATENTS

| Number | Name | Date |
|---|---|---|
| 2,519,212 | Allbert et al. | Aug. 15, 1950 |
| 2,519,213 | Allbert et al. | Aug. 15, 1950 |